US008775389B2

(12) United States Patent
Arcushin et al.

(10) Patent No.: US 8,775,389 B2
(45) Date of Patent: Jul. 8, 2014

(54) IMPLEMENTING CONTINUOUS CONTROL MONITORING FOR AUDIT PURPOSES USING A COMPLEX EVENT PROCESSING ENVIRONMENT

(75) Inventors: Sarit Arcushin, Haifa (IL); Dale Arthur Bell, Cedar Park, TX (US); Millicent Kay Ceron-Hayes, Tampa, FL (US); John Mark Langford, Spring, TX (US); Yonit Magid, Haifa (IL); Guy Sharon, Rehovot (IL); Tal Yatzkar-Haham, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 13/041,396

(22) Filed: Mar. 6, 2011

(65) Prior Publication Data

US 2012/0226670 A1     Sep. 6, 2012

(51) Int. Cl.
*G06F 7/00* (2006.01)
*G06F 17/00* (2006.01)

(52) U.S. Cl.
USPC ........................................................ 707/692

(58) Field of Classification Search
USPC ............................................ 707/692, 999.2
See application file for complete search history.

(56) References Cited

U.S. PATENT DOCUMENTS

| | | | |
|---|---|---|---|
| 6,704,874 B1 * | 3/2004 | Porras et al. ..................... | 726/22 |
| 8,341,645 B1 * | 12/2012 | Oxenstierna et al. ......... | 719/313 |
| 2008/0162592 A1 * | 7/2008 | Huang et al. .................. | 707/202 |
| 2008/0209506 A1 * | 8/2008 | Ghai et al. ........................ | 726/1 |
| 2010/0262448 A1 * | 10/2010 | Mohanty et al. .................. | 705/7 |

* cited by examiner

*Primary Examiner* — Aleksandr Kerzhner

(57) ABSTRACT

A method of providing True Continuous Control Monitoring (CCM) of business processes for audit purposes is provided herein. The method includes the following steps: consolidating data from multiple sources, in case the transactional data is located in more than one source, to a single self contained and comprehensive source; identifying, in the single data source, data elements that are required for detection and reporting for each audit rule; translating and streaming, in case required, the transactions data into events, so that every change in a transaction is immediately reflected and identifiable; eliminating duplicate events for the same single transaction; applying the event processing engine to the events, based on event audit patterns derived from audit rules, possibly entered by non-programmers; and generating alert data in audit-style notation, to be reported back to the system, based on alert notifications derived from the event processing engine.

21 Claims, 4 Drawing Sheets

US 8,775,389 B2

IMPLEMENTING CONTINUOUS CONTROL MONITORING FOR AUDIT PURPOSES USING A COMPLEX EVENT PROCESSING ENVIRONMENT

BACKGROUND

1. Technical Field

The present invention relates to continuous control monitoring using a complex event processing environment.

2. Discussion of the Related Art

In modern enterprise Information Technology (IT) structure, the management and the shareholders receive relatively limited value from traditional audit processes for the following reasons: First, historical, rather than current data is used to assess the level of unmitigated risk in the business processes. Controls deficiencies that are identified have typically occurred in the past and remained unaddressed and therefore seriously undermine the processes control health. Clearly, the more current the data for determining unmitigated risk, the greater the value to management and shareholders due to reduced potential for loss, waste, and mismanagement. Second, traditional auditors are significantly hampered in their detection of serious and pervasive risk, including fraud. Many businesses operate in an environment where data for various business processes are processed using disparate applications. Without appropriate technology, auditors lack the ability and time to efficiently extract the relevant data, and then effectively compile and analyze it for risk relationships otherwise unidentified. This limitation creates additional exposures to management and shareholders that loss, waste, and mismanagement can occur and remain undetected for extended periods of time. Traditional audits are generally cyclical with significant time gaps between engagements, which exacerbate the amount of time that risks can occur and not be corrected.

One emerging solution is continuous control monitoring (CCM). This approach aims to provide the following three objectives: (1) continuous monitoring in the sense that real time data delivered as soon as a transaction is carried out; (2) exhaustive monitoring in the sense that all data sources are monitored simultaneously; and (3) a high level of responsiveness to certain changes tracked, such as audit violation.

Several attempts have been made so far to provide CCM capabilities for audit systems. However, none of the solutions are capable of delivering all of the aforementioned three objectives which are the essential conditions for implementing a so-called "True" CCM. Thus, currently available audit systems which lack real-time monitoring, do not have access to 100% of the data, or do not allow responding as soon as an audit violation is tracked, do not address the specific issues involved in CCM as applied to the audit domain.

BRIEF SUMMARY

One aspect of the invention provides a method of providing so-called "true" Continuous Control Monitoring (CCM) of business processes for audit purposes. "True" CCM is real-time monitoring of 100% of the data which further provide a high level of responsiveness to audit violations. The method includes the following steps: consolidating data from multiple sources, if data is located in more than one source, into a single self contained and comprehensive source; identifying, in the single data source data elements that are required for detection and reporting based on each user-defined audit rule; translating and streaming, in case required, the transactions data into events, so that every change in a transaction is immediately reflected and is further identifiable by an event processing engine; eliminating duplicate events for the same single transaction that may occur in the translating step; applying the event processing engine to the events, based on event audit patterns derived from audit rules; and generating alert data to be reported back to the system, based on alert notifications derived from the event processing engine, such that the audit reports are again made in the audit domain after back-translating the event notifications made in event processing form, into audit-style reports.

Other aspects of the invention may include an audit system arranged to execute the aforementioned method and a computer readable program configured to execute the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
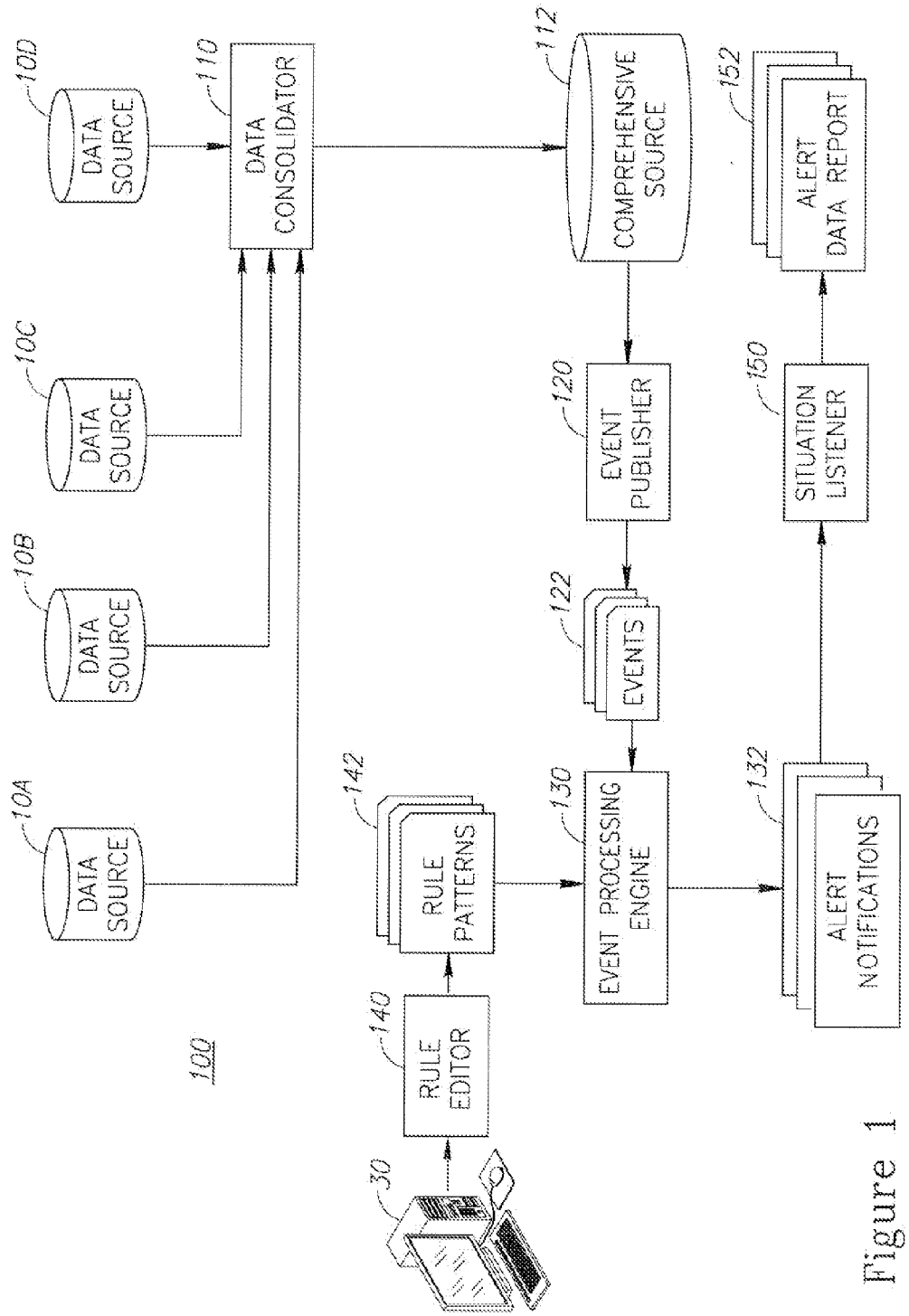
FIG. 1 is a high level schematic block diagram illustrating a system according to some embodiments of the invention.

The drawings together with the following detailed description make apparent to those skilled in the art how the invention may be embodied in practice.

DETAILED DESCRIPTION

Prior to setting forth the detailed description, definitions of certain terms that will be used hereinafter are provided.

The term "Continuous Control Monitoring" or CCM as used herein in this application refers to rules or steps in a process that are defined by an organization or a company in order to ensure that its policies, procedures, and business processes are operating effectively and in accordance with the management requirements.

The term "True CCM" as used herein in this application in the context of audit systems refers to CCM that provides the following three objectives: (1) continuous monitoring in the sense that real time data delivered as soon as a transaction is carried out; (2) exhaustive monitoring in the sense that all data sources are monitored simultaneously; and (3) a high level of responsiveness to certain changes tracked, such as an audit violation.

The term complex event processing or "CEP" as used herein in this application refers to processing multiple events happening across all the layers of an organization, deriving events as function of the processed events to detect significant situations within the event cloud, analyzing their impact, and taking subsequent action in real time. An event may be observed as a change of state with any physical or logical or otherwise discriminated condition. In temporal event processing a timestamp attached to data is used to define the order of occurrence. It is then processed in view of temporal patterns of events, based on the domain rules.

With specific reference now to the drawings in detail, it is stressed that the particulars shown are by way of example and for purposes of illustrative discussion of the preferred embodiments of the present invention only, and are presented to what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments and can be practiced or carried out in various ways. Also, it is to be understood that the phraseology and terminology employed herein is for description purposes and should not be regarded as limiting.

The present invention, in embodiments thereof, applies concepts and methodologies of Complex Event Processing (CEP) and specifically temporal event processing, in order to overcome the drawbacks of traditional internal audits of business processes. Additionally, and according to some embodiments of the present invention, by using an IT environment that is CEP based, auditors (being non-programmers) may be able to convert test attributes from written to electronic form. This saves time and further, improves both the visibility and the comprehensiveness of the audit process.

Advantageously, event processing technology, by virtue of its scalability, may extract predefined data from disparate applications in real time mode, and quickly compile the data as needed. Using a CEP based environment, auditors may monitor, in real time, the data in its entirety (100% of available data at any given point of time), as opposed to currently available solutions which provide a partial view of the data, based upon a sample thereof, for specific control non-compliance, and combinations of transactions indicating fraud.

Consistent with one embodiment of the invention, a wizard or rule editor configured to develop electronic attributes may be provided to the auditor and so enabling him or her to quickly add or modify attributes as business risks change over time. In the case in which no events are detected, auditors can easily determine what areas of a business process are controlled or operating as intended and what areas may warrant more analysis.

Advantageously, applying CEP technology to CCM audit systems provides benefits to the management and the shareholders by reducing the potential for loss, waste, and mismanagement through real time detection of risks and more precise determination of cause, and so enables the auditor to provide more precise recommendations to remediate risks. Additionally, CEP monitoring allows management to perform continuous monitoring or auditing as opposed to cyclical monitoring.

Furthermore, CEP allows management to reallocate constrained audit resource to focus on emerging areas of risks. Advantageously, embodiments of the present invention provide a scalable solution and further benefit the CEP "run once" ease of deployment.

Event processing, and more specifically temporal event processing terminology is a very effective way for expressing CCM derived rules in the audit domain, since these rules are temporally oriented, and are typically expressed using event processing notations. Specifically, event processing technology allows separating between CCM rules logic and the application logic, and as such may provide the flexibility in defining and maintaining the rules in a decoupled manner.

Advantageously, since the control used in continuous control monitoring is typically expressed using temporal terms, expected patterns that are within a certain context are all the building blocks of Event processing concepts. In addition, separating between CCM rules logic and the application logic provides the flexibility in defining and maintaining the rules in a decoupled manner.

However, there is an inherent qualitative difference between the frequency of the reports and the concept of true continuous monitoring. Specifically, it is insufficient to more frequently in order to be considered true continuous monitoring. On the other hand, having a way to stream all of the data and further apply complex patterns and further invoke an alert once a control is circumvented is more likely to be considered as true continuous monitoring.

FIG. 1 is a high level schematic block diagram illustrating an exemplary system 100 configured to provide a so-called "true" CCM for audit purposes of financial IT systems. System 100 is in communication with multiple data sources 10A-10D on which transactional information is stored as data structures such as tables. According to some embodiments, system 100 may include a data consolidator 110, configured to consolidate data from multiple data sources 10A-10D into a single comprehensive source 112. The consolidation is carried out only in a case where data relating to transactions of the monitored financial system is stored on more than one database. In the audit domain, it is typical to have numerous amounts of transactional data stored at different locations and such that consolidation is then necessary. Comprehensive source 112 stores the transactional data in its entirety and may be further configured to identify data elements that are required to be detected and reported, based on a plurality of user-defined audit rules.

System 100 may further include an event publisher 120 that is configured to translate and a stream transaction data received from comprehensive source 112 into events 122, in case any of multiple data sources 10A-10D do not support storing transactional data in events processing notation. In some embodiments, event publisher 120 is further configured to eliminate duplicate data that results in duplicate events. Specifically, duplicate data is sometimes stored in several locations or in several tables and so it is necessary to eliminate redundant data that may be generated during the translation into event notation in order to avoid erroneous event processing.

System 100 may further include a Complex Event Processing (CEP) engine 130 which is configured to receive a stream of events 122 from event publisher 120 and process them based on audit rule patterns 142 that are generated via audit rule editor 140. Rule editor 140 may be implemented in a form of a wizard, accessed usually by non-programmers (such as financial persons and management personnel) over a user interface in a computer 30. Rule editor 140 is arranged such that it enables non-programmers to design audit pattern rules in event processing notation based on an original rule provided in audit rules style.

Event processing engine 130 may be configured to apply the audit rule patterns 152 to the events 122, to yield alert notifications 132 so that any violation of audit rules invokes an alert in event processing notation. Alert notifications 132 may be then translated back to the audit domain via situation listener 140 resulting in alert data reports 142. Alert data reports 142 may be then presented to the non-programmers in a manner that complies with the audit domain.

Figure 2:
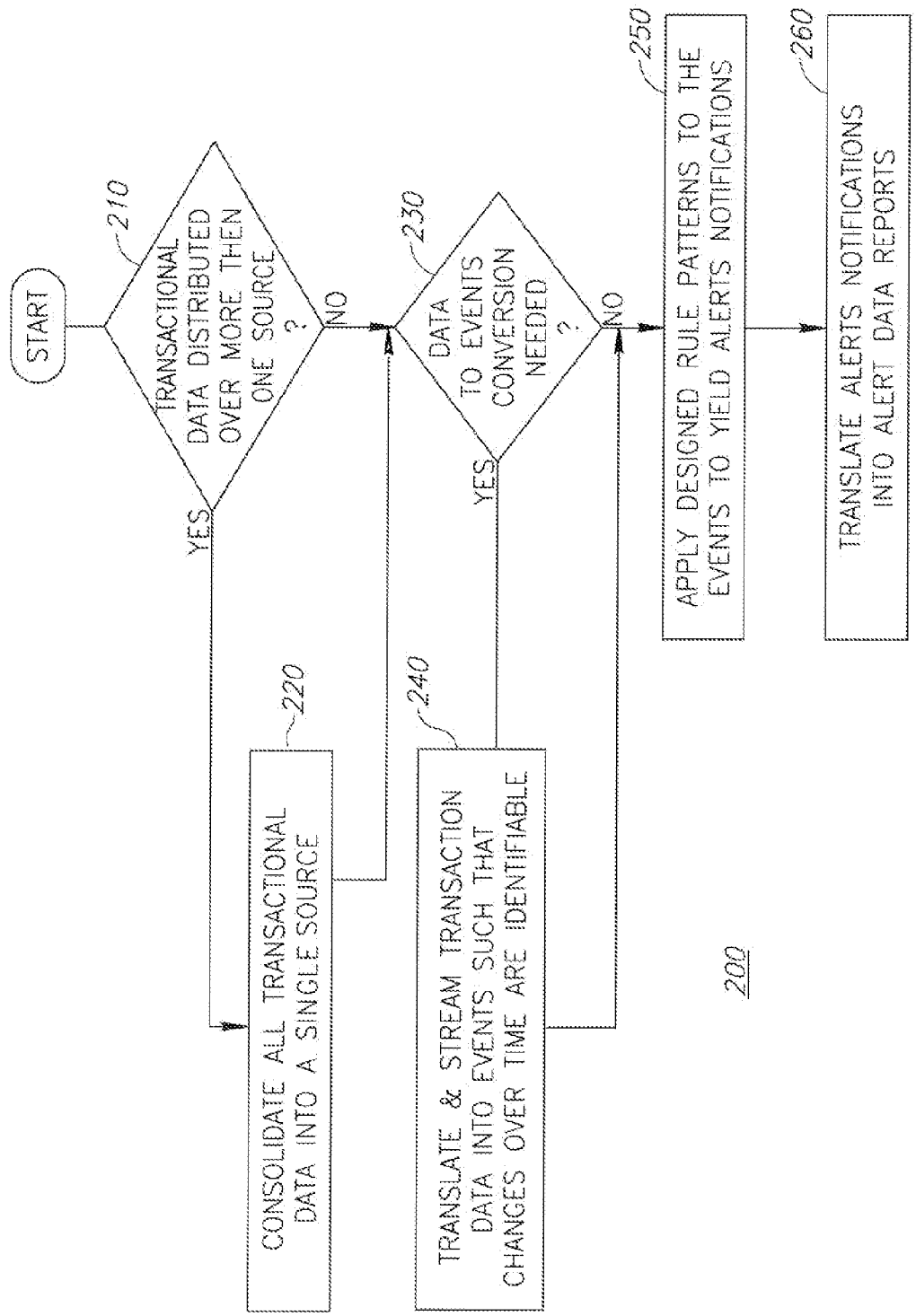
FIG. 2 is a high level flowchart illustrating a method according to some embodiments of the invention.

FIG. 2 is a high level flowchart illustrating a method according to some embodiments of the present invention. Method 200 may be implemented by an architecture other than the aforementioned architecture of system 100. However, for the sake of clarity, some of the description below illustrates steps of method 200 as carried out by elements of system 100. Method 200 shows a plurality of steps which may be carried out in order to effectively apply concepts of complex event processing to continuous control monitoring in the audit domain. These steps are required due to the transactional nature of continuous control monitoring deals, which are not events oriented by nature.

Method 200 starts with a check whether data source consolidating is required 210. If it is, then data consolidation from multiple sources is carried out 220. The consolidation may be carried out by consolidator 110 and data may be consolidated into comprehensive source 112. The method then goes on to check whether a translation of data into events is required 230. If it is required, the data-to-events translation is carried out 240, possibly by event publisher 120 which may also eliminate duplicate data generated by the translation step.

Method 200 then goes on to applying audit patterns to the stream of events to yield alert notifications 250. This applying may be possibly carried out by event processing engine 130 wherein the audit pattern rules are designed possibly by non-programmers using a wizard which enables them to produce audit pattern rules in event processing notation, based on their audit style data.

Finally, the alert notifications are translated into alert data reports, possibly by situation listener 150, so that non programmers may be easily presented with the audit-style reports they are used to, indicating the audit violations monitored using the event processing analysis.

Figure 3:
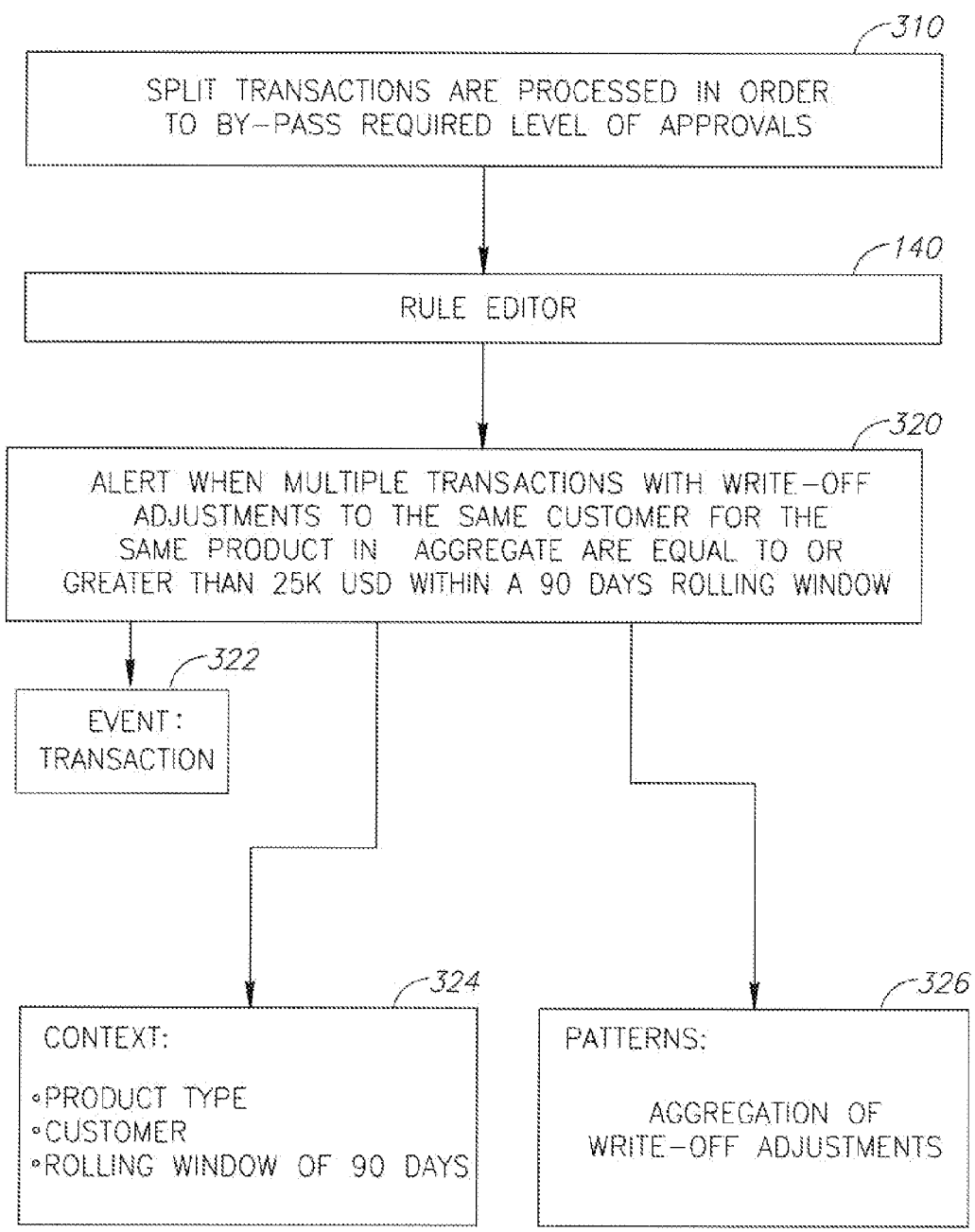
FIG. 3 is a high level flowchart illustrating an example according to some embodiments of the invention.

FIG. 3 is a diagram illustrating an example according to some embodiments of the invention. The illustrated example relates to business transactions with rigorous regulations and examinations being the processing of account receivable transactions. Billing can include write-offs and adjustments larger than a defined value (due to company policy) and so may require additional approvals by higher level management to sign-off on. The process may have built in red flags to handle such conditions. However, inadvertently or on purpose, such a red flag may be circumvented by breaking the transactions into several write-off adjustments with a smaller amount. Besides by-passing company processes and controls, this may expose the company and needs to be avoided or at least identified and mitigated before impacting the business. Auditors may use rule editor 140 to state the required risk pattern to monitor, in this example it may be: "split transactions are processed in order to by-pass required level of approvals" 310. In this example the corresponding event processing rule is in the form of: "alert when multiple transactions with write-off adjustments to the same customer for the same product in aggregate are equal to or greater than 25K USD within a 90 days rolling window" 320. The transactions as stated before are the events 322, context 324 for this rule is a rolling window of 90 days as well as segmentation by customer and product type, and finally the pattern 326 is a threshold on the aggregation of write-off adjustments from the relevant transactions or events. After designing the audit patterns as illustrated above, event processing engine 130 may then apply them to the stream of events 122, to yield alert notifications 132 as detailed above.

Figure 4:
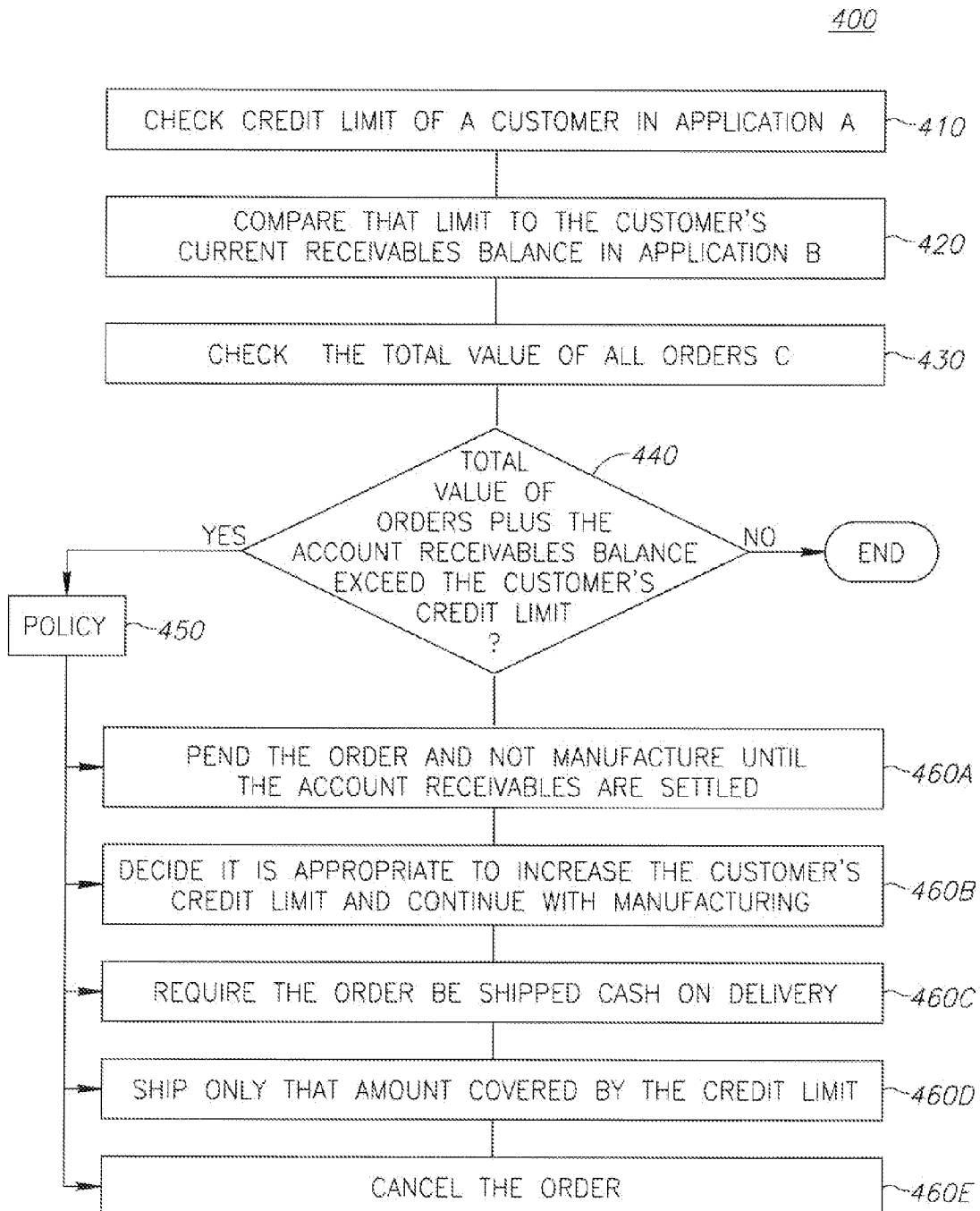
FIG. 4 is a high level flowchart illustrating an example according to some embodiments of the invention.

FIG. 4 is a diagram illustrating yet another exemplary flow 400 according to some embodiments of the invention. The exemplary system focuses now on the credit limit of a customer in application A 410 and compares that limit to the customer's current receivables balance in application B 420. Next the system looks at the total value of all orders C 430. If the total value of orders plus the accounts receivables balance exceed the customer's credit limit 440 then an alert can be issued providing management, based on its policy 450, with the opportunity to: (1) suspend the order and not manufacture until the accounts receivables are settled 460A, (2) decide if it is appropriate to increase the customer's credit limit and continue with manufacturing 460B, (3) require the order be shipped cash on delivery 460C, (4) ship only that amount covered by the credit limit, and/or (5) cancel the order 460D. As illustrated in this example, there is provided for the elimination of unnecessary manufacturing cost and improved safeguarding of assets. The true CCM nature of embodiments of the present invention is illustrated in this example as only a comprehensive approach to processing all data in real time, which may enable a quick response to audit issues raised in this example, thus avoiding risks to manufacturing and shipping.

Embodiments of the present invention address yet another challenge in performing true CCM deriving from the gap between the natural language description of each risk (auditors or managers point of view) and its interpretation as an executable rule, usually done by the technical team. This challenge is addressed by formulating work procedures, to standardize the way auditors describe the risk requirements, that is, a step between the natural language description and the actual resulting rule in the event processing engine's language, which allows both the auditors and the technical teams to speak the same language and fully understand the requirements. This is done after rule templates are agreed upon both by the auditing team and technical team.

Consistent with some embodiments of the invention, a structured representation may be provided, in terminology for auditors or managers, for some of the building blocks of the event processing rule. These building blocks are events, temporal context, spatio-context, and the like. This enables semi-automatic translation from the rule requirements to the event processing executable rules, since it allows automatic mapping between sections in the requirements to the corresponding building block. The additional logic is manually added on top of these building blocks.

During research based on real data experimentations, the applicants have identified recurring patterns which may be translated into patterns in event processing terminology. A non-limiting example relates to accounts receivable. These are associated with recurring patterns across multi geographies such as EMEA, Asia pacific and Latin America. As the logic is constant for each recurring pattern, such rules can be automatically generated from the rules requirements.

Consistent with some embodiments of the invention, a semi-automatic mapping from a natural language requirement to a building block of an executable rule is provided. An exemplary and non limiting mapping may be as follows: (i) data elements are mapped into to an event building block which describes event attributes; (ii) a rule start point and duration is determined, in other words, from which point in time should the rule be active, how long should the rule be active, and the like, would be mapped into temporal context building blocks; (iii) data elements reported by the engine would be mapped to what should be included in the alert report; and finally, (iv) data elements which serve as grouping criteria, would be mapped into segmentation context building block.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more non-transitory computer readable medium(s) may be utilized. The computer readable medium may be a computer readable signal medium or a computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Program code embodied on a non-transitory computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of providing True Continuous Control Monitoring (CCM) of business processes for financial audits, the method comprising:
    consolidating financial transactional data, from plural financial transactions, associated with business processes from multiple data sources into a single source, when the financial transactional data associated with the business processes is stored on more than one data source;
    identifying financial transactional data elements from the financial transactional data associated with the business processes that are required for detecting and reporting, based on user-defined audit rules;
    translating the identified financial transactional data elements to create events, in when at least one of: the financial transactional data associated with the business processes is not stored in event notation; and, the financial transactional data associated with the business processes is not already available as a stream;
    streaming the events to an event processing engine;
    applying said event processing engine to each of the streamed events, based on user-specified audit patterns derived from the user-defined audit rules, to yield alert notifications,
    wherein at least one of: the consolidating, the identifying, the translating, the streaming, and the applying is executed by at least one processor.

2. The method according to claim 1, further comprising eliminating duplicate financial transactions such that the applying is carried out only to a first occurrence of a given financial transaction, based on identifying patterns.

3. The method according to claim 1, further comprising translating the alert notifications provided in event processing notation, into alert data reports provided in an audit-style notation.

4. The method according to claim 1, wherein the audit patterns are specified by applying a semi-automatic translation from audit rule requirements to event processing executable rules, via automatic mapping between a section in a requirement and a corresponding event processing building block.

5. The method according to claim 1, wherein the audit patterns are specified by specifying patterns to apply on financial transitions between one transaction state to another transaction state, to reflect changes in the financial transactions, using a specified mapping.

6. The method according to claim 5, wherein the specified mapping includes at least one of: (i) the data elements mapped into events and attributes; (ii) a user defined audit rule start point and duration mapped into temporal context building blocks; (iii) the data elements reported by a complex event processing engine, mapped to an alert report; and (iv) the data elements, which serve as grouping criteria, mapped into segmentation context building blocks.

7. The method according to claim 1, wherein the audit patterns are generated using a wizard configured to enable a user to change attributes of event processing building blocks affected by audit rule requirements.

8. The method of claim 1, wherein the business processes are selected from the group consisting of: business processes, financial processes, accounting processes, payment processes, compliance processes, business management processes, risk management processes, billing processes, accounts receivable processes, credit processes, asset management processes and manufacturing processes.

9. A system for providing True Continuous Control Monitoring (CCM) of business processes for financial audits, the system comprising:
    a consolidator configured to: (i) consolidate financial transactional data from plural financial transactions associated with business processes from multiple sources into a single comprehensive source, when at least one of: the financial transactional data associated with business processes is stored on more than one data source; and, the financial transactional data associated with the business processes is not already available as a stream; and, (ii) identify financial transactional data elements from the financial transactional data associated with business processes that are required for detecting and reporting, based on user-defined audit rules;

an event publisher configured to translate the identified financial transactional data elements, to create events, when the financial transactional data associated with said business processes is not stored in event notation, and, stream said events from said event publisher; and, an event processing engine configured to apply audit patterns, derived from the user defined audit rules, to the streamed events, to yield alert notifications, wherein at least one of: the consolidator, the event publisher, and the event processing engine is carried out using at least one processor.

10. The system according to claim 9, wherein the event publisher is further configured to eliminate duplicate financial transactions such that the applying is carried out only to a first occurrence of a given financial transaction, based on identifying patterns.

11. The system according to claim 9, further comprising a situation listener configured to translate the alert notifications provided in event processing notation, into alert data reports provided in an audit-style notation.

12. The system according to claim 9, wherein the audit patterns are specified using a rule editor configured to apply a semi-automatic translation from audit rule requirements to event processing executable rules, via automatic mapping between a section in a requirement and a corresponding event processing building block.

13. The system according to claim 9, further comprising a rule editor configured to specify the audit patterns applicable to financial transitions between one financial transaction state to another financial transaction state, to reflect changes in the financial transactions, using a specified mapping.

14. The system according to claim 13, wherein the specified mapping includes at least one of: (i) the data elements mapped into events and attributes; (ii) a user-defined audit rule start point and duration mapped into temporal context building blocks; (iii) the data elements reported by a complex event processing engine, mapped to an alert report; and, (iv) the data elements, which serve as grouping criteria, mapped into segmentation context building blocks.

15. The system according to claim 9, wherein the audit patterns are generated using a wizard configured to enable a user to change attributes of event processing building blocks affected by audit rule requirements.

16. A computer program product for providing True Continuous Control Monitoring (CCM) of business processes for financial audits, the computer program product comprising:

a non-transitory computer readable storage medium having a computer readable program embodied therein, the computer readable program comprising:

computer readable program code configured to consolidate financial transactional data from plural financial transactions associated with business processes from multiple data sources into a single comprehensive source, when at least one of: the financial transactional data associated with business processes is stored on more than one data source; and, the financial transactional data associated with business processes is not already available as a stream;

computer readable program code configured to identify financial transactional data elements from the financial transactional data associated with the business processes that are required for detecting and reporting, based on user-defined audit rules;

computer readable program code configured to translate identified financial transactional data elements, to create events, when the financial transactional data associated with said business processes is not stored in event notation, and stream said events to said event processing engine; and computer readable program code configured to apply an event processing engine to the streamed events, based on user-specified audit patterns, derived from the user-defined audit rules, to yield alert notifications.

17. The computer program product according to claim 16, further comprising computer readable program code configured to eliminate duplicate financial transactions such that the applying is carried out only to a first occurrence of a given financial transaction, based on identifying patterns.

18. The computer program product according to claim 16, further comprising computer readable program code configured to translate the alert notifications provided in event processing notation, into alert data reports provided in an audit-style notation.

19. The computer program product according to claim 16, further comprising computer readable program code configured to apply a semi-automatic translation from audit rule requirements to event processing executable rules, via automatic mapping between a section in a requirement and a corresponding event processing building block.

20. The computer program product according to claim 16, further comprising computer readable program code configured to specify the audit patterns applicable to financial transitions between one financial transaction state to another financial transaction state, to reflect changes in financial transactions, using a specified mapping.

21. The computer program product according to claim 20, wherein the specified mapping includes at least one of: (i) the data elements mapped into events and attributes; (ii) a user defined audit rule start point and duration mapped into temporal context building blocks; (iii) the data elements reported by a complex event processing engine, mapped to an alert report; and, (iv) the data elements, which serve as grouping criteria, mapped into segmentation context building blocks.

* * * * *